US008909511B2

(12) United States Patent  
Liu

(10) Patent No.: US 8,909,511 B2
(45) Date of Patent: Dec. 9, 2014

(54) BILINGUAL INFORMATION RETRIEVAL APPARATUS, TRANSLATION APPARATUS, AND COMPUTER READABLE MEDIUM USING EVALUATION INFORMATION FOR TRANSLATION

(75) Inventor: Shaoming Liu, Kanagawa (JP)

(73) Assignee: Fuji Xerox Co., Ltd., Tokyo (JP)

(*) Notice: Subject to any disclaimer, the term of this patent is extended or adjusted under 35 U.S.C. 154(b) by 396 days.

(21) Appl. No.: 13/245,278

(22) Filed: Sep. 26, 2011

(65) Prior Publication Data

US 2012/0173223 A1    Jul. 5, 2012

(30) Foreign Application Priority Data

Jan. 5, 2011 (JP) ................... 2011-000513

(51) Int. Cl.
*G06F 17/28* (2006.01)
(52) U.S. Cl.
CPC ........ *G06F 17/2827* (2013.01); *G06F 17/2863* (2013.01)
USPC .................................. 704/2; 704/4
(58) Field of Classification Search
CPC .............................. G06F 17/28; G06F 17/2827
USPC .............................................................. 704/2
See application file for complete search history.

(56) References Cited

U.S. PATENT DOCUMENTS

| 2004/0002848 A1* | 1/2004 | Zhou et al. | 704/2 |
| 2006/0004560 A1* | 1/2006 | Whitelock | 704/2 |
| 2006/0206304 A1* | 9/2006 | Liu | 704/2 |
| 2007/0174040 A1* | 7/2007 | Liu et al. | 704/2 |
| 2008/0059146 A1* | 3/2008 | Liu | 704/2 |
| 2008/0126074 A1 | 5/2008 | Whitelock et al. | |
| 2009/0106018 A1* | 4/2009 | Liu | 704/4 |
| 2009/0132235 A1* | 5/2009 | Liu | 704/4 |
| 2009/0271177 A1* | 10/2009 | Menezes et al. | 704/2 |

FOREIGN PATENT DOCUMENTS

| JP | 05204968 | 8/1993 |
| JP | 06290210 | 10/1994 |
| JP | 2008152768 | 7/2008 |
| JP | 2010-152420 A | 7/2010 |
| JP | 2010152419 A * | 7/2010 |
| JP | 2010244385 | 10/2010 |

OTHER PUBLICATIONS

"MARS: A Statistical Semantic Parsing and Generation-Based Multilingual Automatic tRanslation System" Yuqing Gao.*
"Application of Translation Knowledge Acquired by Hierarchical Phrase Alignment for Pattern-based MT" Kenji Imamura.*

(Continued)

*Primary Examiner* — Jialong He
(74) *Attorney, Agent, or Firm* — Sughrue Mion, PLLC

(57) ABSTRACT

A bilingual information retrieval apparatus includes an input text acquisition unit, a first memory, a first language construct information selection unit, a second memory, and a second language construct information selection unit. The input text acquisition unit acquires input text in a first language. The first memory stores plural pieces of first language construct information indicating a construct of text in the first language. The first language construct information selection unit selects a piece of first language construct information corresponding to the input text. The second memory stores plural pieces of second language construct information indicating a construct of text in a second language corresponding to the selected piece of first language construct information. The second language construct information selection unit selects a piece of second language construct information on the basis of evaluation information.

9 Claims, 18 Drawing Sheets

(56) References Cited

OTHER PUBLICATIONS

"Example-based machine translation using DP-matching between word sequences" Eiichiro Sumita.*

Sato et al., "Memory Based Translation," Information Processing Society of Japan, Special Interest Group Technical Reports, Jan. 20, 1989, vol. 89, No. 6, pp. 70.9-1-70.9.8.

Japanese Office Action issued May 7, 2014 in Japanese Patent Application No. 2011-000513.

* cited by examiner

FIG. 3

INPUT TEXT: 彼 は 電車 に 乗る。

BILINGUAL EXAMPLE PATTERN:
[v] は [v] に 乗る。
[v] 坐 [v]

TRANSLATED TEXT: 他 坐 电车

FIG. 4

EXAMPLE PATTERN:
  VARIABLE ITEM 1, FIXED ITEM 1, VARIABLE ITEM 2, ...

VARIABLE ITEMS:

| POSITION INFORMATION | TYPE INFORMATION | VARIABLE INFORMATION | LEXICON INFORMATION | USAGE-EXAMPLE INFORMATION |
|---|---|---|---|---|

FIXED ITEMS:

| POSITION INFORMATION | TYPE INFORMATION | FIXED CONTENT | PART-OF-SPEECH INFORMATION | SUB-STRUCTURE INFORMATION |
|---|---|---|---|---|

FIG. 5

SOURCE-LANGUAGE EXAMPLE PATTERN:
   v/NP/人/ f/が/61/ v/NP/人/ f/を/61/
   f/改選する/89/attribute change[改選/17/ する/47/]

TARGET-LANGUAGE EXAMPLE PATTERN:
   v/NP/人/ f/改选/v/ v/NP/人/

ALIGNMENT (INTERLANGUAGE CORRESPONDENCE) INFORMATION:
   3:1-1;501,502-2;3-3

FIG. 6

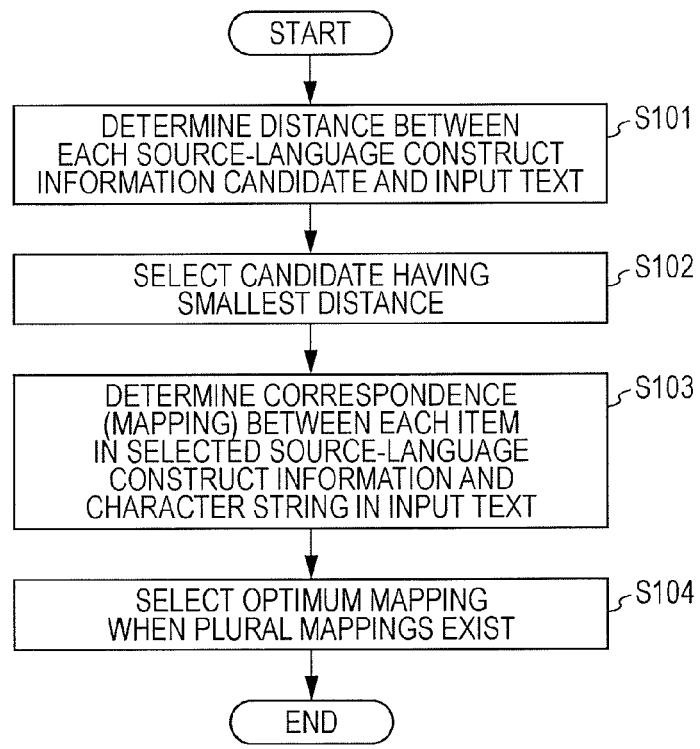

START
↓
DETERMINE DISTANCE BETWEEN EACH SOURCE-LANGUAGE CONSTRUCT INFORMATION CANDIDATE AND INPUT TEXT — S101
↓
SELECT CANDIDATE HAVING SMALLEST DISTANCE — S102
↓
DETERMINE CORRESPONDENCE (MAPPING) BETWEEN EACH ITEM IN SELECTED SOURCE-LANGUAGE CONSTRUCT INFORMATION AND CHARACTER STRING IN INPUT TEXT — S103
↓
SELECT OPTIMUM MAPPING WHEN PLURAL MAPPINGS EXIST — S104
↓
END

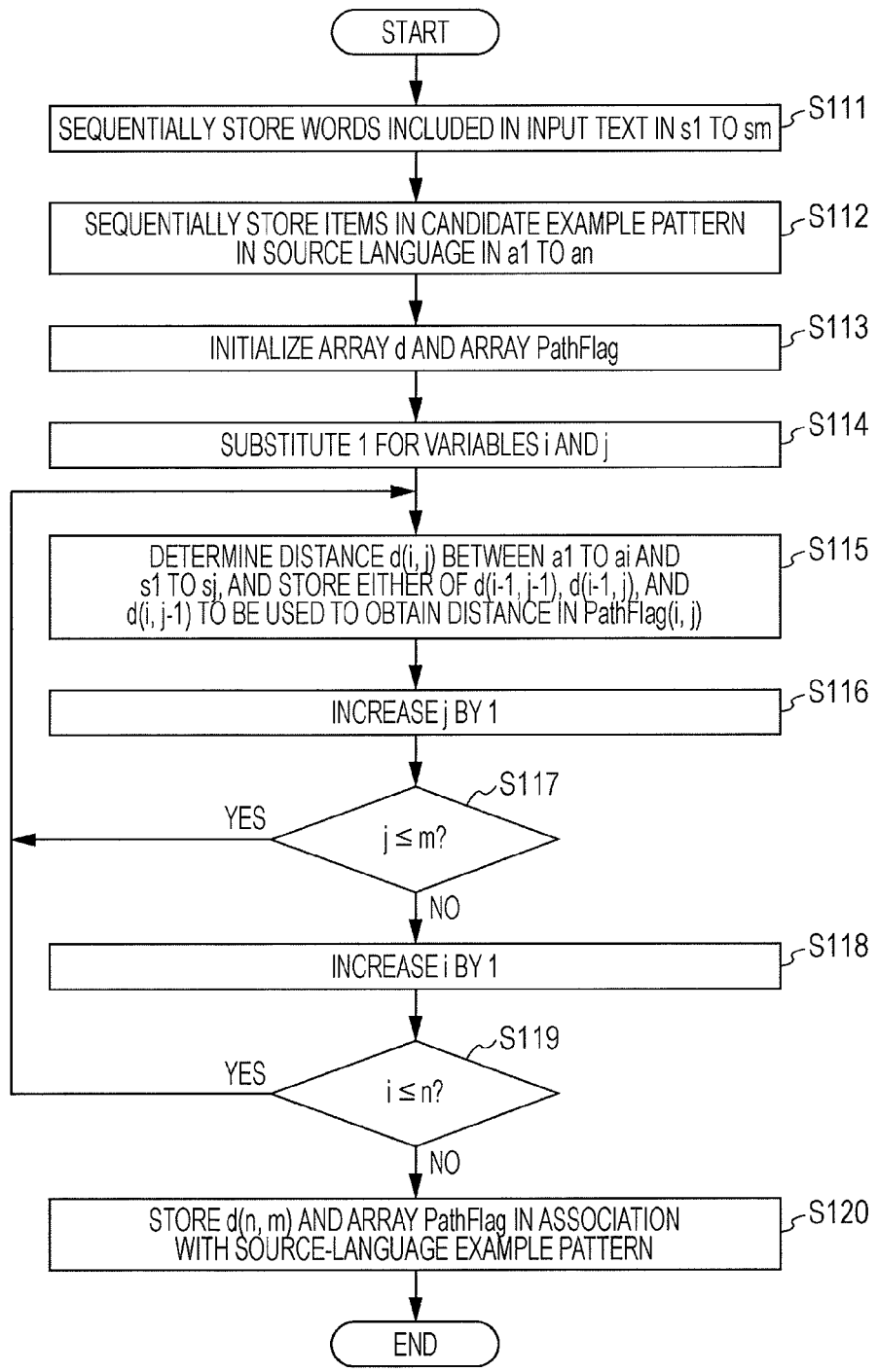

FIG. 8

| a \ s | s0: (NULL CHARACTER STRING) | s1: 私 | s2: は | s3: 富士 | s4: ゼロックス | s5: の | s6: 社員 | s7: です |
|---|---|---|---|---|---|---|---|---|
| a0: (NULL CHARACTER STRING) | 0 | 1 | 2 | 3 | 4 | 5 | 6 | 7 |
| a1: [V] | 1 | 0 | 0 | 0 | 0 | 0 | 0 | 0 |
| a2: は | 2 | 1 | 0 | 1 | 1 | 1 | 1 | 1 |
| a3: [V] | 3 | 2 | 1 | 0 | 0 | 0 | 0 | 0 |
| a4: です | 4 | 3 | 2 | 1 | 1 | 1 | 1 | 0 |

FIG. 9C

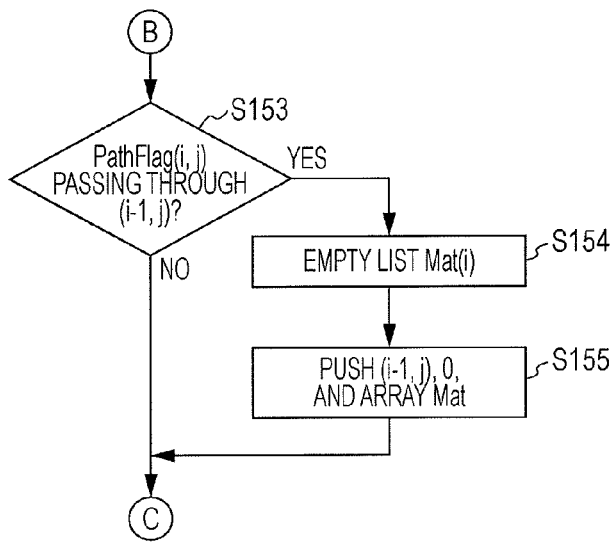

FIG. 10

BILINGUAL EXAMPLE PATTERN 1:
    SOURCE-LANGUAGE EXAMPLE PATTERN:  v/NP1/人物/  f/は//
                                                               v/NP2/乗り物/電車|飛行機|船  f/に//  f/乗る//
    TARGET-LANGUAGE EXAMPLE PATTERN:  v/NP1//  f/坐//  v/NP2//

BILINGUAL EXAMPLE PATTERN 2:
    SOURCE-LANGUAGE EXAMPLE PATTERN:  v/NP1/人物/  f/は//
                                                               v/NP2/調子|話/リズム|情話|史話  f/に//  f/乗る//
    TARGET-LANGUAGE EXAMPLE PATTERN:  v/NP1//  f/听从//  v/NP2//

BILINGUAL EXAMPLE PATTERN 3:
    SOURCE-LANGUAGE EXAMPLE PATTERN:  v/NP1/人物/  f/は//
                                                               v/NP2/動物|乗り物/馬|自転車  f/に//  f/乗る//
    TARGET-LANGUAGE EXAMPLE PATTERN:  v/NP1//  f/骑//  v/NP2//

JAPANESE TEXT: 私はリンゴを食べている (I am eating an apple)

CHINESE TEXT: 我正在吃苹果

FIG. 15

| | EVALUATION VALUE Sep1 | EVALUATION VALUE Sep2 | EVALUATION VALUE Sep3 | EVALUATION VALUE Sep4 | EVALUATION VALUE Sep5 | COMPREHENSIVE EVALUATION VALUE SepP |
|---|---|---|---|---|---|---|
| BILINGUAL EXAMPLE PATTERN 1 | 1 | 1 | 1 | 0.9 | 0 | 0.81 |
| BILINGUAL EXAMPLE PATTERN 2 | 1 | 0.5 | 0.5 | 0.1 | 0 | 0.34 |
| BILINGUAL EXAMPLE PATTERN 3 | 1 | 1 | 0.95 | 0.3 | 0 | 0.5625 |

FIG. 16

INPUT TEXT: 彼は電車に乗る

TRANSLATION GENERATED USING BILINGUAL EXAMPLE PATTERN 1: 他座电车

TRANSLATION GENERATED USING BILINGUAL EXAMPLE PATTERN 2: 他听从电车

TRANSLATION GENERATED USING BILINGUAL EXAMPLE PATTERN 3: 他骑电车

BILINGUAL INFORMATION RETRIEVAL APPARATUS, TRANSLATION APPARATUS, AND COMPUTER READABLE MEDIUM USING EVALUATION INFORMATION FOR TRANSLATION

CROSS-REFERENCE TO RELATED APPLICATIONS

This application is based on and claims priority under 35 USC 119 from Japanese Patent Application No. 2011-000513 filed Jan. 5, 2011.

BACKGROUND

Technical Field

The present invention relates to a bilingual information retrieval apparatus, a translation apparatus, and a computer readable medium.

SUMMARY

According to an aspect of the invention, there is provided a bilingual information retrieval apparatus including an input text acquisition unit, a first memory, a first language construct information selection unit, a second memory, and a second language construct information selection unit. The input text acquisition unit acquires input text in a first language. The first memory stores plural pieces of first language construct information indicating a construct of text in the first language. Each of the plural pieces of first language construct information includes a fixed item indicating a fixed character string in the text and a variable item, indicating a variable character string in the text. The first language construct information selection unit selects a piece of first language construct information corresponding to the input text from among the plural pieces of stored first language construct information. The second memory stores plural pieces of second language construct information indicating a construct of text in a second language corresponding to the selected piece of first language construct information. Each of the plural pieces of second language construct information includes a fixed item indicating a fixed character string in the text and a variable item indicating a variable character string in the text. The second language construct information selection unit selects a piece of second language construct information from among the plural pieces of second language construct information stored in the second memory on the basis of evaluation information associated with the plural pieces of first language construct information and the plural pieces of second language construct information.

BRIEF DESCRIPTION OF THE DRAWINGS

Exemplary embodiment(s) of the present invention will be described in detail based on the following figures, wherein:

FIG. 3 illustrates an example in which input text in the source language is translated using a bilingual example pattern;

FIG. 4 illustrates the data structure of one example pattern;

FIG. 5 illustrates an exemplary bilingual example pattern;

FIG. 6 illustrates an exemplary process flow of a source-language construct information selection unit;

FIG. 7 illustrates an exemplary process flow of the distance calculation unit;

FIG. 8 illustrates an exemplary calculation process of the distance calculation unit;

FIG. 9C illustrates an exemplary process flow of the mapping extraction unit;

FIG. 10 illustrates exemplary bilingual example patterns when plural bilingual example patterns exist for selected source-language construct information;

FIG. 15 illustrates an example of how to select a target-language example pattern from candidates illustrated in FIG. 10; and FIG. 16 illustrates an example of a translation generated by using the calculation based on the fourth evaluation criterion.

DETAILED DESCRIPTION

Figure 1:
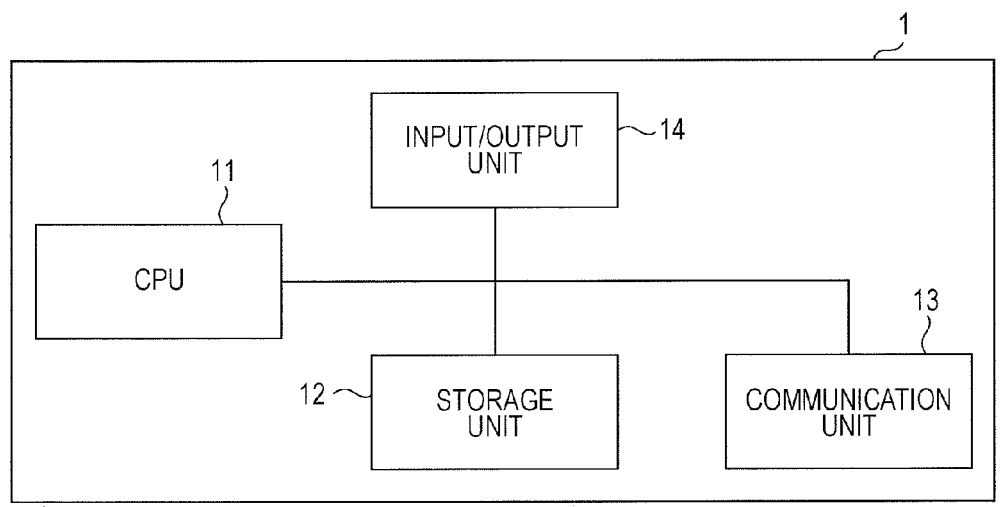
FIG. 1 illustrates an example configuration of a translation apparatus according to an exemplary embodiment of the present invention.

An exemplary embodiment of the present invention be described in detail hereinafter with reference to the drawings. FIG. 1 illustrates an example configuration of a translation apparatus 1 according to an exemplary embodiment of the present invention. As illustrated in FIG. 1, the translation apparatus 1 includes a central processing unit (CPU) 11, a storage unit 12, a communication unit 13, and an input/output unit 14. The translation apparatus 1 may be, for example, a personal computer, a server, or a similar apparatus.

The CPU 11 operates in accordance with a program stored in the storage unit 12. The program may be provided by being stored in an information recording medium such as a compact disc read-only memory (CD-ROM) or a digital versatile disc read-only memory (DVD-ROM), or may be provided via a network such as the Internet.

The storage unit 12 may be a memory element such as a random access memory (RAM) or a ROM, a hard disk drive, or a similar device. The storage unit 12 stores the program described above. The storage unit 12 also stores information input from the individual units and computational results.

The communication unit 13 may be a communication medium or the like that is connected to another device to establish communication. The communication unit 13 inputs information received from another device to the CPU 11 or the storage unit 12 under control of the CPU 11, and transmits the information to another device.

The input/output unit 14 may be a unit that controls a display output unit such as a monitor and an input unit such as a keyboard or a mouse, or a similar device. The input/output unit 14 outputs image data or any other suitable data to a monitor or the like under control of the CPU 11, and acquires information from an operator through a keyboard or a mouse.

Figure 2:
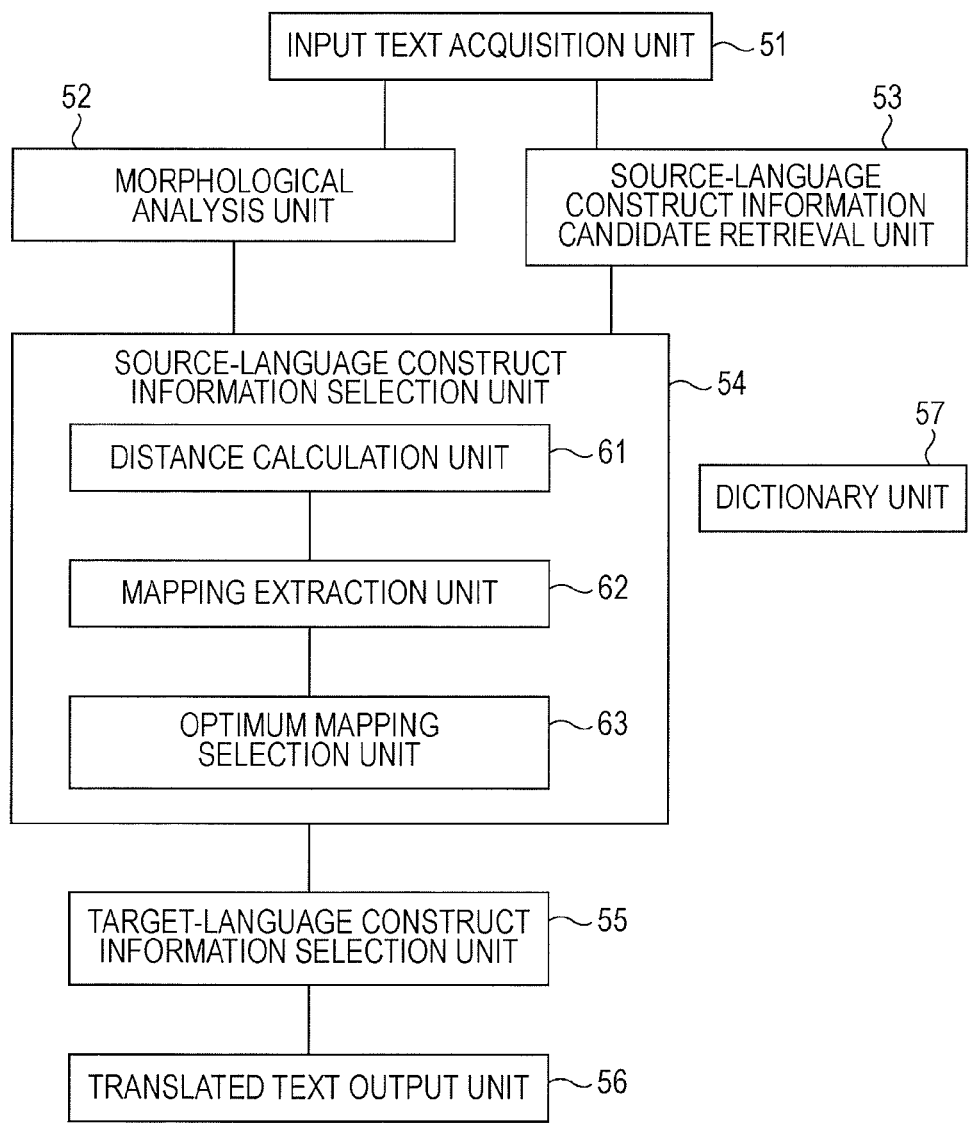
FIG. 2 is a functional block diagram illustrating functions implemented by the translation apparatus according to the exemplary embodiment of the present invention.

FIG. 2 is a functional block diagram illustrating functions implemented by the translation apparatus 1 according to the exemplary embodiment of the present invention. The translation apparatus 1 functionally includes an input text acquisition unit 51, a morphological analysis unit 52, a source-language construct information candidate retrieval unit 53, a source-language construct information selection unit 54, a target-language construct information selection unit 55, a translated text output unit 56, and a dictionary unit 57. The source-language construct information selection unit 54 functionally includes a distance calculation unit 61, a mapping extraction unit 62, and an optimum mapping selection unit 63. The above functions may be implemented by executing, by the CPU 11, the program stored in the storage unit 12 and controlling the communication unit 13 and the input/output unit 14.

Here, the translation apparatus 1 according to this exemplary embodiment may perform translation using bilingual information. The bilingual information includes bilingual example patterns including source-language example patterns indicating patterns of text in the source language and target-language example patterns indicating patterns of text in the target language to which the text in the source language is translated. FIG. 3 illustrates an example in which input text in the source language is translated using a bilingual example pattern. In the bilingual example pattern, "[v]" represent a variable item indicating that corresponding one or plural words are variable. In the example illustrated in FIG. 3, when "彼は電車に乗る。(He rides a train.)" is entered as input text, translated text illustrated in FIG. 3 may be obtained. In the translation process, the translation apparatus 1 retrieves an optimum bilingual example pattern including a source-language example pattern "[v] は [v] に乗る。([v] ride/rides [v].)" that matches the input text, and applies the translated terms of the words in the input text corresponding to [v] in the source-language example pattern to the [v] portions in "[v] 坐 [v]" which is the target-language example pattern in the bilingual example pattern to obtain translated text. The above translation technique is called pattern-based translation. Since both a source-language example pattern and a target-language example pattern represent text using a variable character string and a fixed character string in combination, example patterns in both languages are hereinafter referred to collectively as "example patterns".

In the translation apparatus 1, the input text acquisition unit 51, the morphological analysis unit 52, the source-language construct information candidate retrieval unit 53, the source-language construct information selection unit 54, and the target-language construct information selection unit 55 perform the process described above for retrieving a bilingual example pattern. A mechanism including the above components may be used as a bilingual information retrieval apparatus.

FIG. 4 illustrates the data structure of one example pattern. The example pattern may be information indicating the constructs of text in a certain language. The example pattern includes plural items each of which corresponds to one or multiple character strings among character strings making up the text, and the items may be divided into fixed items and variable items. Each fixed item represents a uniquely determined fixed character string as a corresponding character string in the text, and each variable item represents, as a corresponding character string in the text, a variable character string including the number of characters. The term "character string", as used here, represents a word or a phrase having plural words. One example pattern includes one or multiple fixed items and one or multiple variable items. In FIG. 4, fixed items and variable items are arranged in order, starting from those to be located at the beginning of the text.

Each variable item includes position information, type information, variable information, lexicon information, and usage-example information. Each fixed item includes position information, type information, fixed content, part-of-speech information, and sub-structure information. Position information is included in both a fixed item and a variable item, and may represent the position in which the corresponding item appears in the text, where the position is represented as a sequential number. The type information may be information indicating whether the corresponding item is a variable item or a fixed item, and may be set as "f" for a fixed item and to "v" for a variable item. The variable information may be information indicating the part of speech of a variable item. For example, "NP" represents a noun variable, "AP" represents an adjective variable, and "DP" represents an adverb variable. The lexicon information may be information indicating the lexicon of a word included in a variable item. The usage-example information may be information indicating usage examples of a word included in a variable item in the example pattern. The fixed content may be information indicating a character string of a fixed item, and the part-of-speech information may be information indicating the part of speech of a word set as a fixed item. For example, a fixed item with part-of-speech information "61" represents a Japanese particle. The sub-structure information indicates information about each of plural words making up a fixed item.

Here, information indicating the presence of a variable item and information about the fixed content of a fixed item, which may be characteristic in an example pattern, are referred to as "language construct information". Specifically, the language construct information may correspond to position information and type information in a variable item and position information, type information, and fixed content in a fixed item. In the following description, language construct information included in a source-language example pattern is hereinafter referred to as "source-language construct information", and language construct information included in a target-language example pattern is hereinafter referred to as "target-language construct information".

FIG. 5 illustrates an example of a bilingual example pattern. The bilingual example pattern includes a source-language example pattern, a target-language example pattern, and alignment information. In the example pattern illustrated in FIG. 5, a delimiter between a fixed item and a variable item is a space, and a delimiter between pieces of information included in a fixed item and a variable item is a forward slash (/). In FIG. 5, furthermore, position information is represented by the order in which fixed items and variable items are arranged, instead of using any mark in an individual variable item or fixed item. For example, "v/NP/人/", which is the first item in the source-language example pattern, indicates that the item is a variable item having a variable indicating that this part of speech is a noun, a lexicon "人" (persons), and no usage examples set therein. The fifth item in the source-language example pattern, "f/改選する/89/attribute change [改選/17/する/47/]", indicates that the item is a fixed item with a character string "改選する", which is a verb (89) with an irregular conjunction named sa-gyo henkaku katsuyo or a sa-row irregular conjunction, which is one of Japanese verb conjunctions. The character string "改選する" is composed of sub-structures "改選 (kaisen (re-election))" and "する (suru (to do))", in which attributes change.

The alignment information may be interlanguage correspondence information including correspondences between variable items in the source language and variable items in the target language and correspondences between fixed items in the source language and fixed items in the target language. In FIG. 5, "3:" indicates that three associations are present, "1-1;" indicates that the first item in the source-language example pattern is associated with the first item in the target-language example pattern, and "501, 502-2;" indicates that the first and second sub-items of the fifth item in the source-language example pattern are associated with the second item in the target-language example pattern. Here, "501" indicates the first sub-item of the fifth item in the source-language example pattern.

The dictionary unit 57 may be implemented by the CPU 11 and the storage unit 12. The dictionary unit 57 may store plural bilingual example patterns, a word dictionary, a bilingual example dictionary, and any other suitable information.

The process described above for translation using a bilingual example pattern will be hereinafter described in more detail. The input text acquisition unit 51 may be implemented by the CPU 11, the storage unit 12, the communication unit 13, and the input/output unit 14. The input text acquisition unit 51 acquires information about input text that is text input in the source language from information about the operation of a keyboard, which is acquired through the input/output unit 14, information acquired from the storage unit 12, or information received from a client device connected via a network.

The morphological analysis unit 52 may be implemented by the CPU 11 and the storage unit 12. The morphological analysis unit 52 applies morphological analysis to the input text to obtain plural words making up the input text and part-of-speech information about each of the words. As a result of the morphological analysis of "彼は電車に乗る (he rides a train)", for example, the morphological analysis unit 52 may obtain five words, "彼 (he)", "は", "電車 (a train)", "に", and "乗る (rides)", and also obtain part-of-speech information about the respective words, i.e., a noun, a Japanese particle, a noun, a Japanese particle, and a verb.

The source-language construct information candidate retrieval unit 53 may be implemented by the CPU 11 and the storage unit 12. The source-language construct information candidate retrieval unit 53 retrieves source-language construct information candidates from plural bilingual example patterns stored in the dictionary unit 57. The source-language construct information selection unit 54 selects source-language construct information from the candidates. Once a candidate of source-language construct information is retrieved, a source-language example pattern including the source-language construct information and a bilingual example pattern including the source-language example pattern may also be specified.

More specifically, in the retrieval processing described above, the source-language construct information candidate retrieval unit 53 retrieves a source-language construct information candidate with a degree of similarity Sim and a cover rate Cov between the input text and a fixed item in the source-language construct information being greater than respective thresholds. The source-language construct information candidate retrieval unit 53 determines bigrams (S) in a character string in the input text and bigrams (A) in a character string in the source-language construct information, and calculates the degree of similarity Sim and the cover rate Cov from the bigrams (S) and bigrams (A). The degree of similarity Sim and the cover rate Cov may be determined by the following equations:

$$Sim = (2 \times |S \cap A|)/(|S|+|A|), \text{ and}$$

$$Cov = |S \cap A|/|S|,$$

where $|S|$ denotes the number of bigrams included in the input text, $|A|$ denotes the number of bigrams in the source-language construct information, and $|S \cap A|$ denotes the number of bigrams common to the input text and the source-language construct information.

The source-language construct information selection unit 54 may be implemented by the CPU 11 and the storage unit 12. The source-language construct information selection unit 54 selects a piece of source-language construct information corresponding to the input text from plural pieces of source-language construct information that indicate the constructs of a source language text. Each of the plural pieces of source-language construct information includes a fixed item indicating a fixed character string in the text and a variable item indicating a variable character string in the text. More specifically, the source-language construct information selection unit 54 selects a piece of source-language construct information that is the closest to the input text from plural pieces of source-language construct information candidates retrieved by the source-language construct information candidate retrieval unit 53, and further acquires mapping information indicating correspondences between character strings included in the input text and variable items and fixed items in the source-language construct information. When a piece of source-language construct information is selected, a source-language example pattern and a bilingual example pattern including the selected piece of source-language construct information may also substantially be selected. The source-language construct information selection unit 54 may select plural pieces of source-language construct information if plural pieces of source-language construct information are the closest to the input text.

FIG. 6 illustrates an exemplary process flow of the source-language construct information selection unit 54. First, the distance calculation unit 61 in the source-language construct information selection unit 54 determines a distance between each source-language construct information candidate and input text (step S101). This process is performed by the distance calculation unit 61 in the source-language construct information selection unit 54. The processing of step S101 will be described hereinafter with reference to the process flow of the distance calculation unit 61.

The distance calculation unit 61 may be implemented by the CPU 11 and the storage unit 12. FIG. 7 illustrates an exemplary process flow of the distance calculation unit 61. In FIG. 7, only a process flow of calculating a distance between input text and one source-language construct information candidate is illustrated. In actuality, the illustrated process flow is repeated a number of times corresponding to the number of source-language construct information candidates. First, the distance calculation unit 61 sequentially stores words (the number of which is presented by m) in the input text, which is divided by the morphological analysis unit 52, in data strings s1 to sm (step S111). Then, the distance calculation unit 61 determines, for each of variable items and fixed items (the total number of which is represented by n) in one source-language construct information candidate, an information set including information indicating whether or not the item is a variable item and information about a character string of fixed content when the item is a fixed item, and sequentially stores the information sets in data strings a1 to an in order, starting from the item with the smallest value of position information (step S112). In the following description, s0 and a0 are also used, which represent the beginnings of the input text and the source-language construct information, respectively, and correspond to null character strings.

The distance between input text and source-language construct information may depend on the correspondences between individual words in the input text and variable items and fixed items in the source-language construct information. The distance between the input text and the source-language construct information may be determined by determining a conversion weight for each of plural potential correspondences between the input text and the source-language construct information and setting the smallest conversion weight among the determined conversion weights as the distance. A conversion weight for a certain correspondence may be determined by integrating a weight between each of variable items and fixed items and a corresponding word and a weight between a word and an item when the word and the item do not correspond to each other. More specifically, for example, it is assumed that ai (where is 1 to n) corresponds to sj (where j is 1 to m). In this case, if ai and sj represent the same word, the editing weight may be 0 because no editing may be required. If ai and sj represent different words, replacement may be required and therefore the editing weight may be p. If no sj corresponding to ai exists, the addition of a word to the input text may be required and therefore the editing weight may be q. Conversely, if no ai corresponding to sj exists, the deletion of a word from the input text may be required and therefore the editing weight may be r. Resulting weights are integrated. Here, p, q, and r are positive constants. The correspondences may satisfy the condition that the words in the source-language construct information are not reordered or the words in the input text are not reordered and the condition that a variable item may correspond to plural words in the input text. The former condition is that, for example, if ai and sj correspond to each other, a(i+1) and s(j−1) do not correspond to each other. The latter condition is generated because a variable item may be a phrase including plural words. From the former condition, the minimum distance d(i, j) among all the correspondences between a1 to ai in the source-language construct information and s1 to sj in the input text may be determined if all the d(i−1, j−1), d(i−1, j), and d(i, j−1) and the relationship between ai and sj are obtained. A calculation method using the above rules will be described.

The distance calculation unit 61 initializes a two-dimensional (n+1)×(m+1) array d storing distance values, and an n×m array PathFlag indicating which of d(i−1, j−1), d(i−1, j), and d(i, j−1) is to be used to obtain the distance d(i, j) (step S113). The array d has d(0, 0) to d(n, m), and d(i, j) denotes the distance between the character string segments a1, a2, . . . , ai and s1, s2, . . . , sj. i×q is substituted into d(i, 0), and j×r is substituted into d(0, j). The array PathFlag has PathFlag(1, 1) to PathFlag(n, m). Next, 1 is substituted for the variables i and j (step S114), and iterative processing is initiated. The distance calculation unit 61 determines the distance d(i, j) between a1 to ai and s1 to sj, and stores either of d(i−1, j−1), d(i−1, j), and d(i, j−1) to be used to obtain the distance d(i, j) in PathFlag(i, j) (step S115). d(i, j) may be calculated by the following method:

If ai is a variable item, $$d(i,j)=\min\{d(i-1,j-1)+w(ai,sj),d(i-1,j)+q,d(i,j-1)\}.$$

If ai is a fixed item, $$d(i,j)=\min\{d(i-1,j-1)+w(ai,sj),d(i-1,j)+q,d(i,j-1)+r\}.$$

In the above equations, for example, w(ai, sj) is 0 if ai is a variable item. For example, if ai is a fixed item, w(ai, sj) is 0 when ai and sj are equal, and is p when ai and sj are not equal.

If plural distances among d(i−1, j−1), d(i−1, j), and d(i, j−1) are minimum, information about all the distances is stored in PathFlag(i, j).

Next, the distance calculation unit 61 increase j by 1 (step S116). If j is less than or equal to m (YES in step S117), the process repeats from step S115. If j is not less than or equal to m (NO in step S117), the distance calculation unit 61 increases i by 1 (step S118), and determines whether or not i is less than or equal to n (step S119). If i is less than or equal to n (YES in step S119), the process repeats from step S115. If i is not less than or equal to n (NO in step S119), the distance calculation unit 61 stores the distance variable d(n, m) and the array PathFlag in association with the source-language example pattern (step S120). Then, the process ends.

FIG. 8 illustrates an exemplary calculation process of the distance calculation unit 61. In a table illustrated in FIG. 8, each cell has a value representing the value of a corresponding one of the cells of the array d, and arrows represent through which cells among cells from upper left to lower right, cells from left to right, and cells from up to down calculation is performed to obtain a distance. In the illustrated example, a distance is calculated for input text "私は富士ゼロックスの社員です (i am an employee of Fuji Xerox)" and a source-language construct information candidate "[v] は [v] です ([v] am/are/is [v])", by way of example. In the illustrated example, p=q=r=1. It may be seen from the illustrated table that the array PathFlag represents the relationship between words in the input text and variable items and fixed items when a distance is calculated.

After the distance between the input text and each source-language construct information candidate is determined using the processing of step S101, the source-language construct information selection unit 54 selects a source-language construct information candidate with the minimum distance from among the source-language construct information candidates (step S102). Here, the number of pieces of source-language construct information to be selected is not limited to one. Regardless of whether the number of types of source-language construct information with a minimum distance is one, for example, if plural bilingual example patterns having the same source-language construct information exist, a number of pieces of source-language construct information corresponding to the number of bilingual example patterns may be selected.

Then, the source-language construct information selection unit 54 determines a correspondence (hereinafter referred to as a "mapping") between each of fixed items and variable items of the selected source-language construct information and a character string in the input text (step S103). The processing of step S103 may be performed by the mapping extraction unit 62 in the source-language construct information selection unit 54. The processing of step S103 will be described hereinafter with reference to a process flow of the mapping extraction unit 62.

Figure 9A:
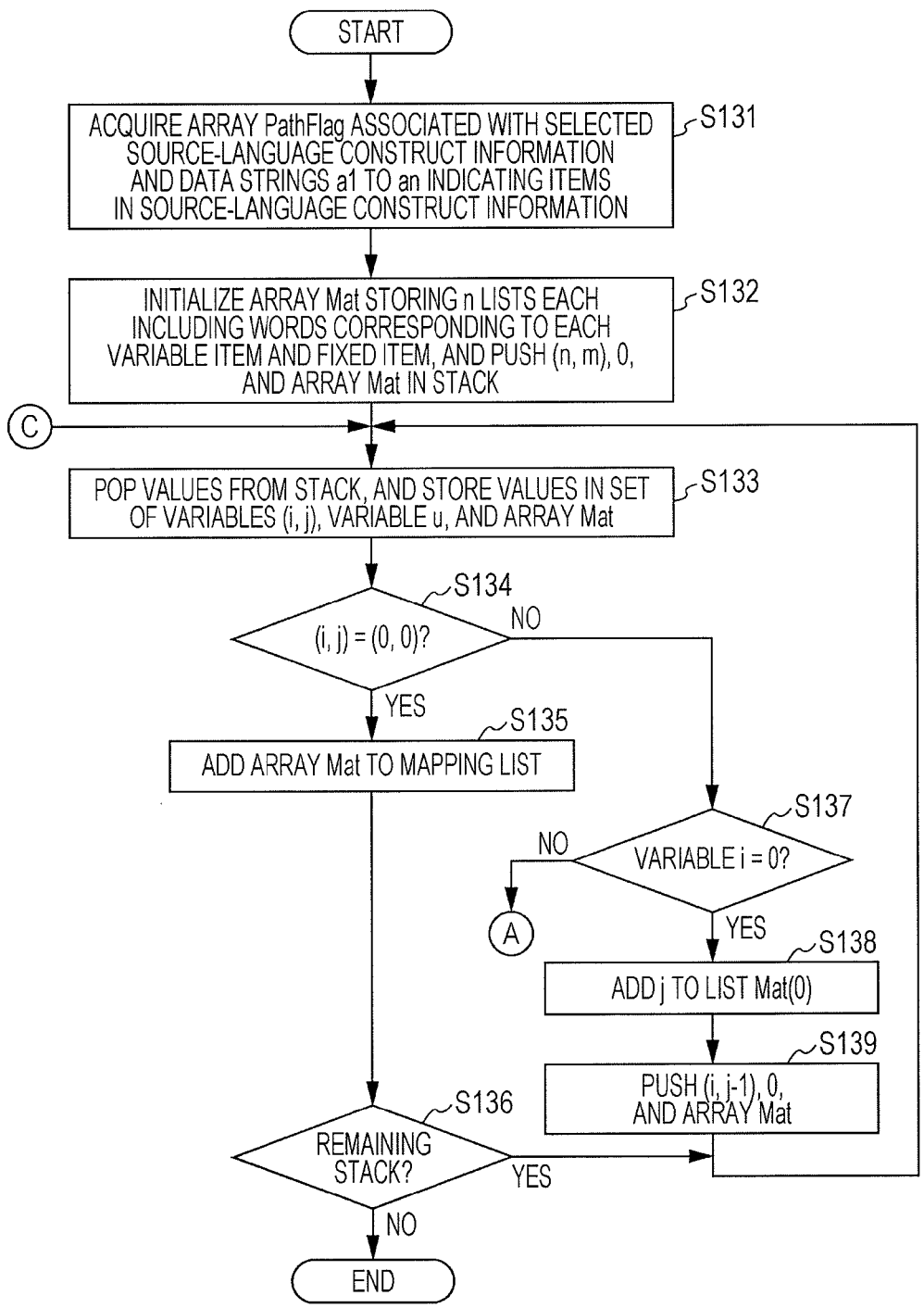
FIG. 9A illustrates an exemplary process flow of the mapping extraction unit.
Figure 9B:
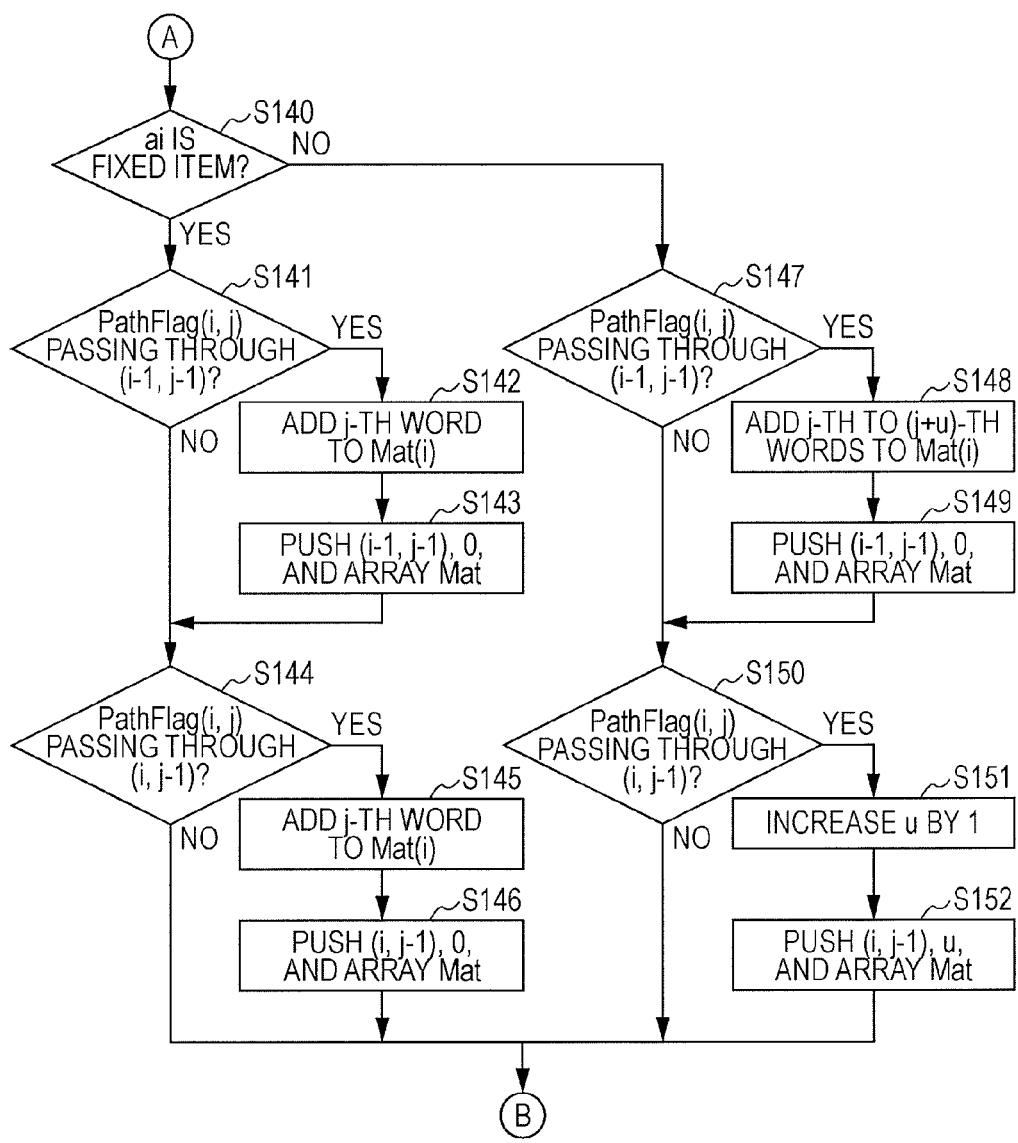
FIG. 9B illustrates an exemplary process flow of the mapping extraction unit.

The mapping extraction unit 62 may be implemented using the CPU 11 and the storage unit 12. FIGS. 9A to 9C illustrate an exemplary process flow of the mapping extraction unit 62. First, the mapping extraction unit 62 acquires an array PathFlag stored in association with the selected source-language construct information, and also acquires data strings a1 to an in which information about variable items and fixed items included in the source-language construct information is stored in order indicated by position information (step S131). Specifically, the information about the variable items and the fixed items includes information as to whether or not the item is a variable item and information about a character string of fixed content when the item is a fixed item. Next, the mapping extraction unit 62 initializes an array Mat including n lists each storing one or multiple words corresponding to each variable item and fixed item in the selected source-language construct information, and pushes (n, m), 0, and the array Mat in a stack (step S132).

Next, the mapping extraction unit 62 pops the above values from the stack, and stores the values in a set of variables (i, j), a variable u, and the array Mat (step S133). If the set of variables (i, j) is (0, 0) (YES in step S134), a mapping has been determined, and therefore the array Mat is added to a mapping list Fset (step S135). If any stack remains (YES in step S136), the process repeats from step S133. If no stack remains (NO in step S136), the process ends. If it is determined in step S134 that the set of variables (i, j) is not (0, 0) (NO in step S134), it is determined whether or not the variable i is 0 (step S137). If the variable i is 0 (YES in step S137), the j-th word in the input text is missing and therefore is added to the list Mat(0) (step S138). The set of variables (i, j−1), 0, and the array Mat are pushed (step S139). Then, the process repeats from step S133.

If it is determined in step S137 that the variable i is not 0 (NO in step S137), it is determined whether or not ai is a fixed item (step S140). If ai is a fixed item (YES in step S140), determination for the PathFlag(i, j) is performed (step S141). If the PathFlag(i, j) indicates that d(i, j) has been determined from d(i−1, j−1) (YES in step S141), the j-th word is added to the list Mat(i) (step S142), and the set of variables (i−1, j−1), 0, and the array Mat are pushed (step S143). The PathFlag(i, j) indicating that d(i, j) has been determined from d(i−1, j−1) is hereinafter referred to as "the PathFlag(i, j) passing through (i−1, j−1)". Further, the PathFlag(i, j) indicating that d(i, j) has been determined from d(i, j−1) and d(i−1, j) is hereinafter referred to as "the PathFlag(i, j) passing through (i, j−1)" and "the PathFlag(i, j) passing through (i−1, j)", respectively. If it is determined in step S141 that the PathFlag(i, j) does not pass through (i−1, j−1) (NO in step S141) and after the processing of step S143, it is determined whether or not the PathFlag(i, j) passes through (i, j−1) (step S144). If the PathFlag(i, j) passes through (i, j−1) (YES in step S144), this means that the addition of a word may be required and therefore the j-th word is added to the list Mat(i) (step S145), and the set of variables (i, j−1), 0, and the array Mat are pushed (step S146). If it is determined in step S144 that the PathFlag(i, j) does not pass through (i, j−1) (NO in step S144) and after the processing of step S146, the process proceeds to step S153.

If it is determined in step S140 that ai is a variable item (NO in step S140), it is determined whether or not the PathFlag(i, j) passes through (i−1, j−1) (step S147). If the PathFlag(i, j) passes through (i−1, j−1) (YES in step S147), the j-th to (j+u)-th words are added to the list Mat(i) (step S148), and the set of variables (i−1, j−1), 0, and the array Mat are pushed (step S149). If it is determined in step S147 that the PathFlag (i, j) does not pass through (i−1, j−1) (NO in step S147) and after the processing of step S149, it is determined whether or not the PathFlag(i, j) passes through (i, j−1) (step S150). If the PathFlag(i, j) passes through (i, j−1) (YES in step S150), u is increased by 1 (step S151), and the set of variables (i, j−1), the variable u, and the array Mat are pushed (step S152). If it is determined in step S150 that the PathFlag(i, j) does not pass through (i, j−1) (NO in step S150) and after the processing of step S152, the process proceeds to step S153.

In step S153, it is determined whether or not the PathFlag(i, j) passes through (i−1, j). If the PathFlag(i, j) passes through (i−1, j) (YES in step S153), this means that word missing has occurred. Thus, the list Mat(i) is emptied (step S154), and the set of variables (i−1, j), 0, and the array Mat are pushed (step S155). If it is determined in step S153 that the PathFlag(i, j) does not pass through (i−1, j) (NO in step S153) and after the processing of step S155, the process repeats from step S133. With the above processes, a mapping list Fset is acquired. The use of a stack allows plural mappings to be obtained.

After a mapping has been obtained through the processing of step S103, the source-language construct information selection unit 54 checks whether or not plural mappings exist. If plural mappings exist, one of the mappings is selected (step S104). The processing of step S104 may be performed by the optimum mapping selection unit 63. The optimum mapping selection unit 63 may be implemented by the CPU 11 and the storage unit 12. If plural mappings exist, the optimum mapping selection unit 63 evaluates, for each mapping, a phrase including words that are variable items in accordance with some standards, and selects one mapping from the total assessment of the obtained evaluations. Examples of the standards for evaluation include whether or not the phrase is found in a dictionary, and whether or not the phrase includes a verb, a particle, or an auxiliary verb.

The target-language construct information selection unit 55 may be implemented by the CPU 11 and the storage unit 12. The target-language construct information selection unit 55 selects one piece of target-language construct information, based on evaluation information associated with source-language construct information and target-language construct information, from among plural pieces of target-language construct information indicating the constructs of target language text corresponding to the selected source-language construct information. Each of the plural pieces of target-language construct information includes a fixed item indicating a fixed character string in the text and a variable item indicating a variable character string in the text. The evaluation information may refer to a portion of a bilingual example pattern, from which source-language construct information is excluded. The bilingual example pattern includes a source-language example pattern and a target-language example pattern, and is therefore associated with source-language construct information and target-language construct information. Further, the variable information (part-of-speech information), lexicon, and usage-example information in a variable item in the source-language example pattern, and the interlanguage correspondence information, bilingual example information, etc., in the bilingual example pattern are also associated with the source-language construct information. The variable information (part-of-speech information), lexicon, and usage-example information in a variable item are information indicating the attributes of the variable item. Selecting target-language construct information may be substantially equivalent to also selecting a target-language example pattern and a bilingual example pattern.

If plural pieces of target-language construct information and plural bilingual example patterns including the selected source-language construct information exist, the target-language construct information selection unit 55 selects one piece of target-language construct information and one bilingual example pattern from among the plural pieces of target-language construct information corresponding to the selected source-language construct information. FIG. 10 illustrates exemplary bilingual example patterns when plural bilingual example patterns exist for selected source-language construct information. In the example illustrated in FIG. 10, " 彼は電車に乗る (he rides a train)" is given as input text, and source-language construct information "[v] は [v] に乗る ([v] ride/rides [v])" ([v] represents a variable item) is selected. In the illustrated example, three bilingual example patterns including the source-language construct information may exist. The first bilingual example pattern means that a person travels in a vehicle. The second bilingual example pattern means that a person dances to the rhythm or gets carried away tune. The third bilingual example pattern means that a person sits on and controls an animal or the like. In FIG. 10, for ease of understanding, instead of using alignment information, a common number is assigned to variable information in a variable item in the source-language example pattern and variable information in a variable item in the target-language example pattern to show the correspondence between the variable item in the source-language example pattern and the variable item in the target-language example pattern. Other elements are represented in accordance with the same notation as that in the data structure of bilingual example patterns illustrated in FIG. 5.

Figure 11:
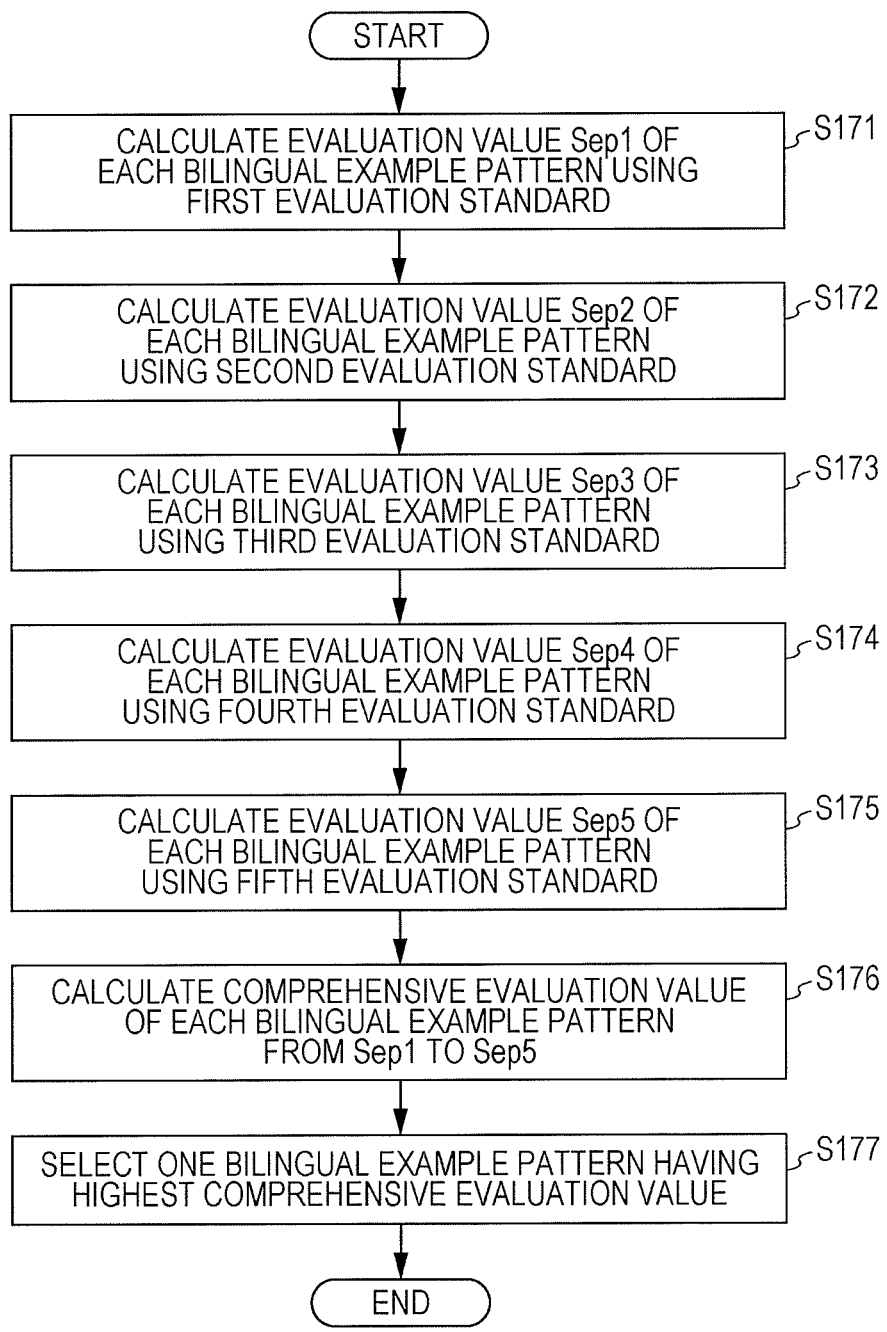
FIG. 11 illustrates an exemplary process flow of a target-language construct information selection unit.
Figure 12A:
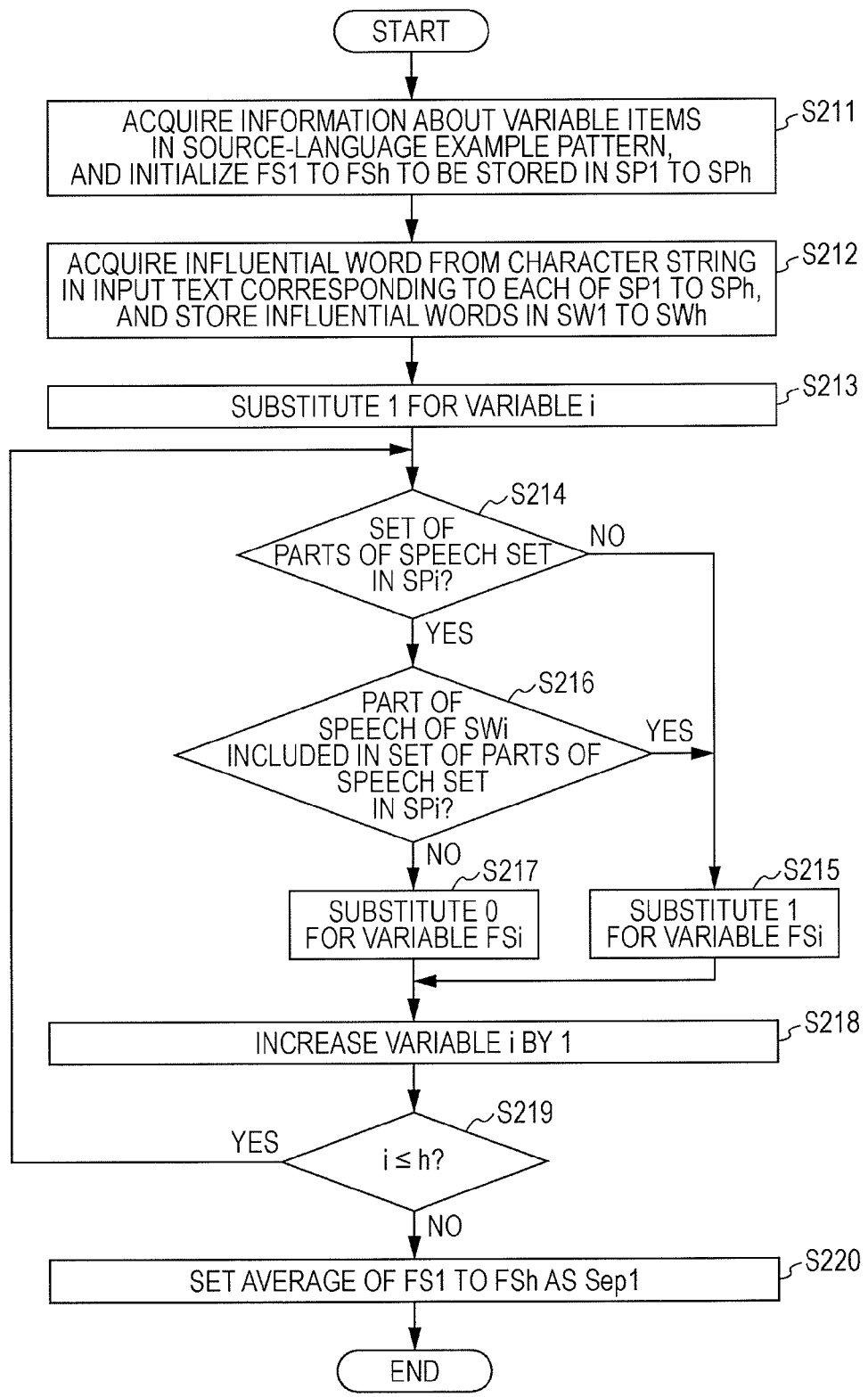
FIG. 12A illustrates a process flow of calculating an evaluation value using a first evaluation criterion.
Figure 12B:
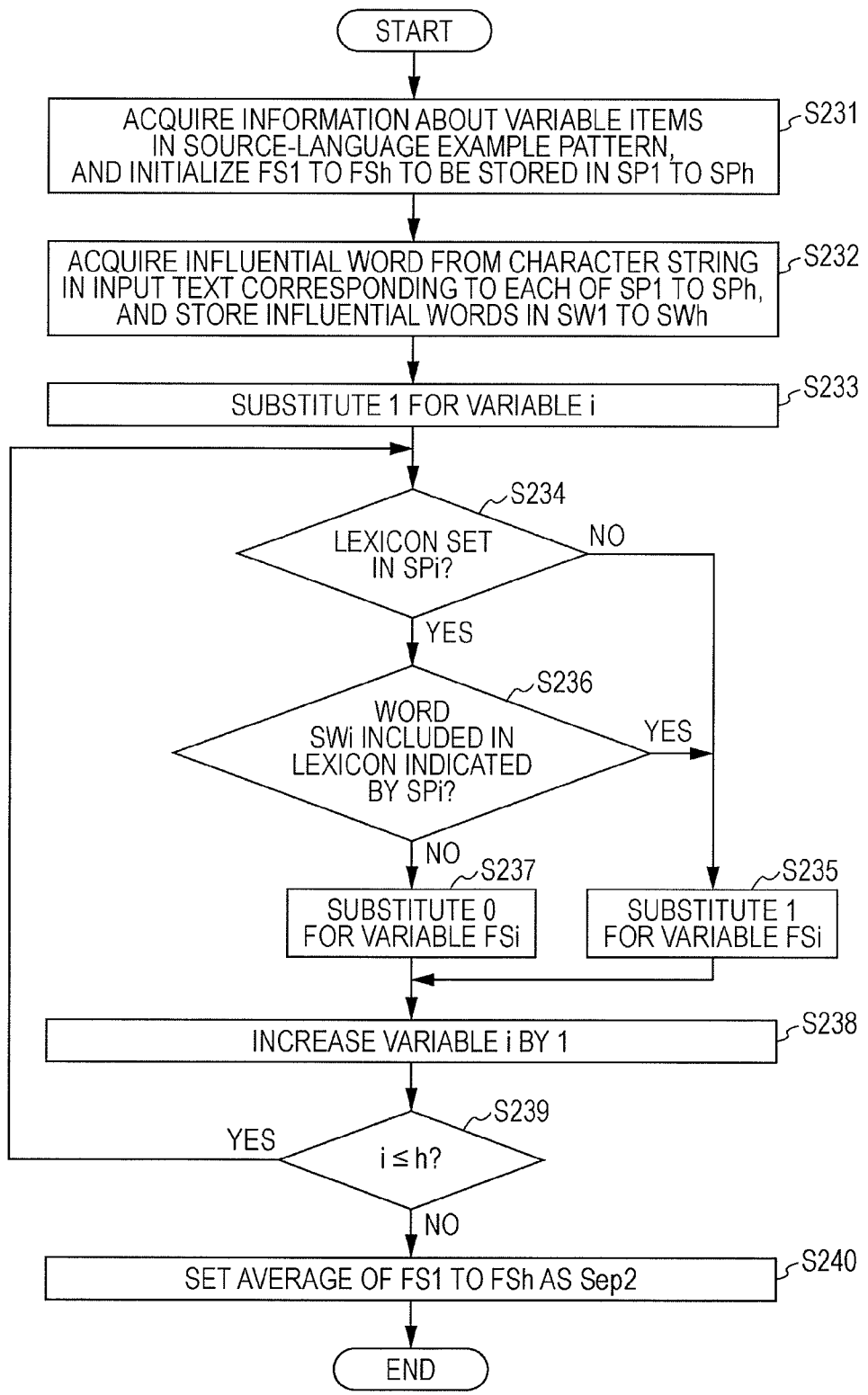
FIG. 12B illustrates a process flow of calculating an evaluation value using a second evaluation criterion.
Figure 12C:
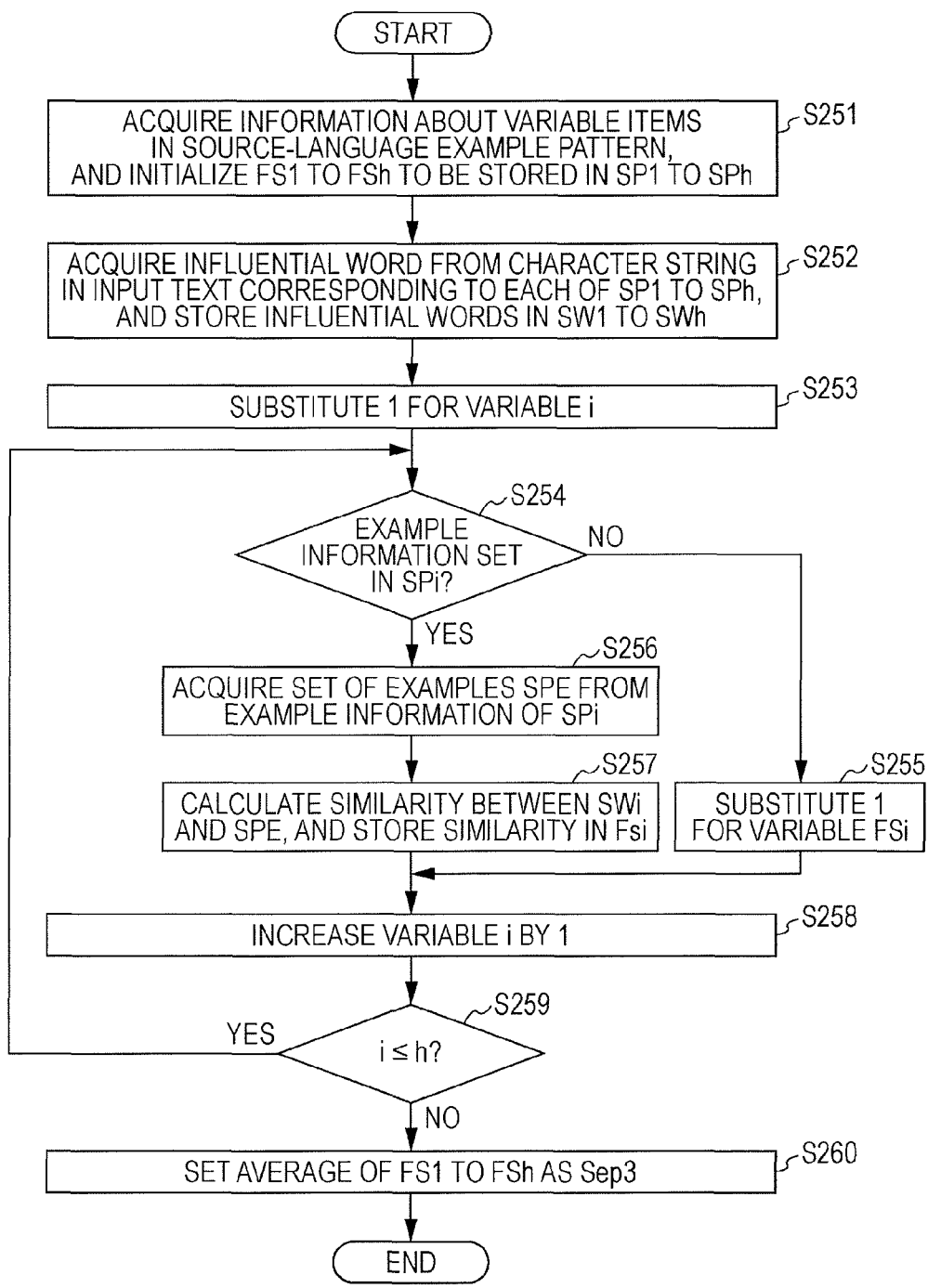
FIG. 12C illustrates a process flow of calculating an evaluation value using a third evaluation criterion.
Figure 12D:
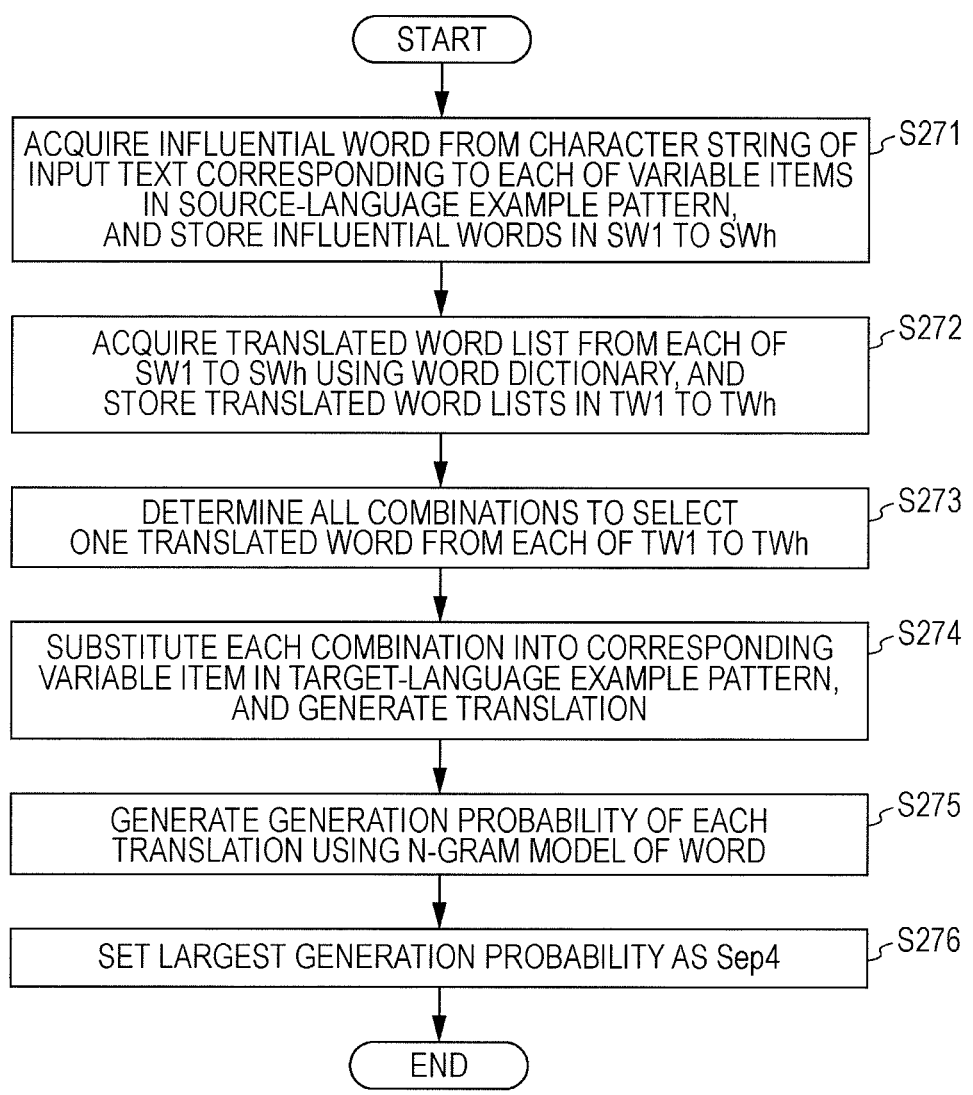
FIG. 12D illustrates a process flow of calculating an evaluation value using a fourth evaluation criterion.
Figure 12E:
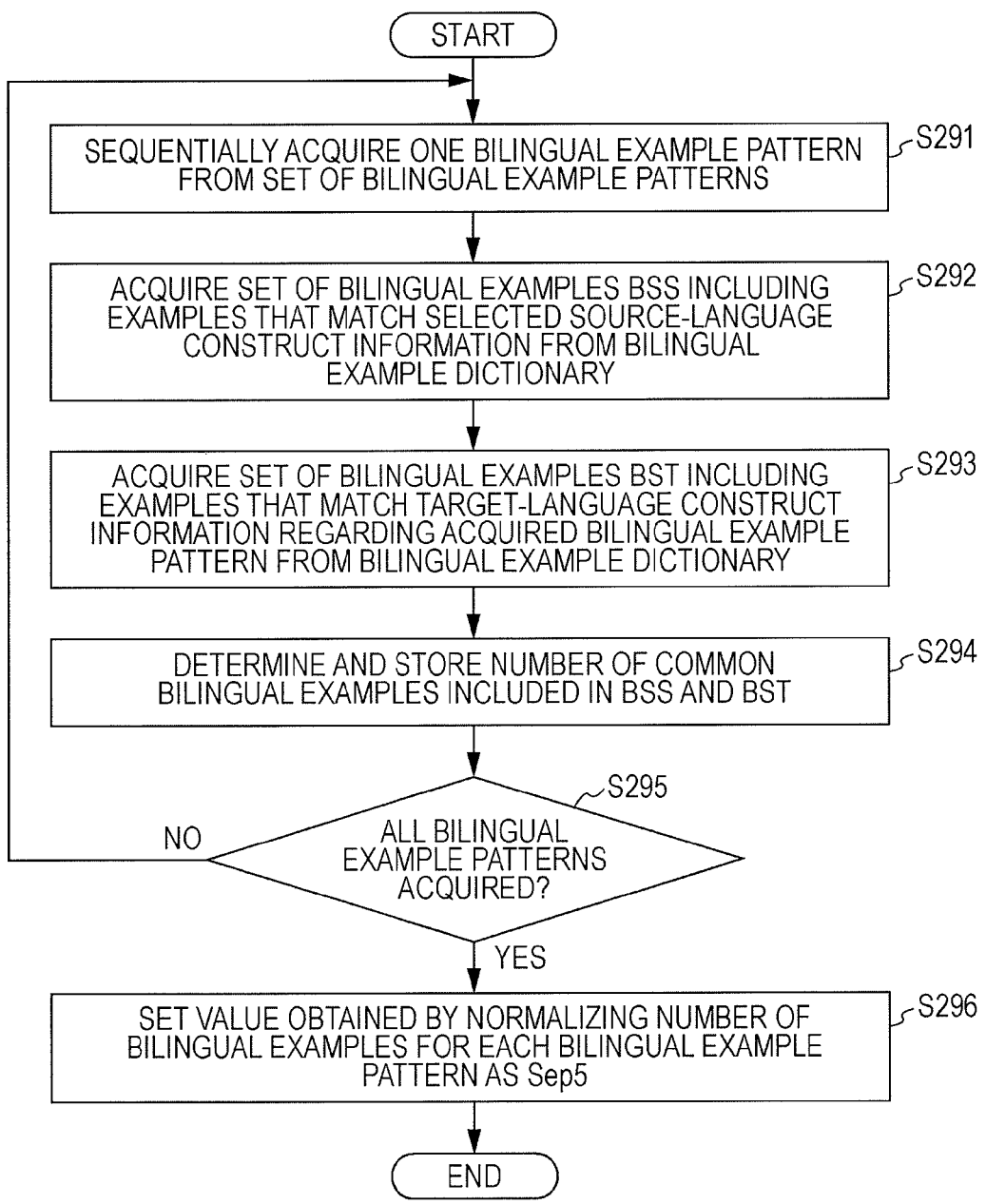
FIG. 12E illustrates a process flow of calculating an evaluation value using a fifth evaluation criterion.

The target-language construct information selection unit 55 acquires a set of bilingual example patterns including the selected source-language construct information, calculates, for each of the bilingual example patterns, evaluation values Sep1 to Sep5 based on five evaluation criteria, and selects a bilingual example pattern on the basis of a comprehensive evaluation value SepP obtained by taking the weighted sum of the evaluation values Sep1 to Sep5. FIG. 11 illustrates an exemplary process flow of the target-language construct information selection unit 55. FIGS. 12A, 12B, 12C, 12D, and 12E illustrate a process flow of calculating the evaluation value Sep1 using the first evaluation criterion, a process flow of calculating the evaluation value Sep2 using the second evaluation criterion, a process flow of calculating the evaluation value Sep3 using the third evaluation criterion, a process flow of calculating the evaluation value Sep4 using the fourth evaluation criterion, and a process flow of calculating the evaluation value Sep5 using the fifth evaluation criterion, respectively. FIGS. 12A to 12D illustrate only a process for one bilingual example pattern. In the processes for calculating the evaluation values Sep1 to Sep3 using the first to third evaluation criteria, the target-language construct information selection unit 55 may select one piece of target-language construct information on the basis of the attributes of a character string in the input text corresponding to a variable item in source-language construct information and on the basis of information that associates the attributes of a variable item in the source-language construct information with the target-language construct information.

The calculation of the evaluation value Sep1 based on the first evaluation criterion (step S171) will be described. The target-language construct information selection unit 55 selects one piece of target-language construct information on the basis of information that associates part-of-speech information about a word in the input text, the part of speech of a variable item included in the selected source-language construct information, and target-language construct information. First, the target-language construct information selection unit 55 acquires information about variable items (the number which is represented by h) in a source-language example pattern included in a certain bilingual example pattern, stores the information in SP1 to SPh, and initializes variables FS1 to FSh that store the results of processing the respective variable items (step S211). Then, the target-language construct information selection unit 55 acquires an influential word from a character string (one or multiple words) in the input text corresponding to each of SP1 to SPh, and stores the influential words in variables SW1 to SWh (step S212). The term "influential word", as used here, is a word among one or multiple words corresponding to a variable item, which is connected to another fixed item or variable item. In the Japanese language, the last word may be an influential word. Then, the target-language construct information selection unit 55 substitutes 1 for the variable i (step S213).

The target-language construct information selection unit 55 checks whether or not information (variable information) about the set of parts of speech has been set in the i-th variable item SPi (step S214). If the information has not been set (NO in step S214), the target-language construct information selection unit 55 substitutes 1 for the variable Fsi (step S215). If the information has been set (YES in step S214), it is determined whether or not the set of parts of speech includes the part of speech of SWi (step S216). The part of speech of SWi may be acquired from the process results of the morphological analysis unit 52. If the set of parts of speech includes the part of speech of SWi (YES in step S216), the target-language construct information selection unit 55 substitutes 1 for the variable FSi (step S215). If the set of parts of speech does not include the part of speech of SWi (NO in step S216), the target-language construct information selection unit 55 substitutes 0 for the variable FSi (step S217). After substituting some value for the variable Fsi, the target-language construct information selection unit 55 increases the variable i by 1 (step S218). If the value i is less than or equal to h (YES in step S219), the process repeats from step S214. If the value i exceeds h (NO in step S219), the average of FS1 to FSh is acquired, and is set as the evaluation value Sep1 based on the first evaluation criterion for the bilingual example pattern (step S220). The processing of steps S211 to S220 is performed for all the selected bilingual example patterns.

For example, in the example illustrated in FIG. 10, when "彼は電車に乗る (he rides a train)" is acquired as input text, "彼 (he)" and "電車 (a train)" which are words corresponding to variable items in the source-language construct information are nouns, and these variable items are noun variables in any of the bilingual example patterns 1 to 3. Thus, evaluation value Sep1 is 1.

The calculation of the evaluation value Sep2 based on the second evaluation criterion (step S172) will be described. The target-language construct information selection unit 55 selects one piece of target-language construct information on the basis of information that associates a character string in the input text corresponding to a variable item in the source-language construct information, a lexicon, and target-language construct information. First, the target-language construct information selection unit 55 stores information about variable items (the number which is represented by h) in a source-language example pattern included in a certain bilingual example pattern in SP1 to SPh, and initializes variables FS1 to FSh (step S231). Then, the target-language construct information selection unit 55 acquires an influential word from a character string (one or multiple words) in the input text corresponding to each of SP1 to SPh, and stores the influential words in variables SW1 to SWh (step S232). Then, the target-language construct information selection unit 55 substitutes 1 for the variable (step S233).

The target-language construct information selection unit 55 checks whether or not lexicon information has been set in the i-th variable item SPi (step S234). If the lexicon information has not been set (NO in step S234), the target-language construct information selection unit 55 substitutes 1 for the variable FSi (step S235). If the lexicon information has been set (YES in step S234), it is determined whether or not the lexicon indicated by the lexicon information includes the word SWi (step S236). If the lexicon includes the word SWi (YES in step S236), the target-language construct information selection unit 55 substitutes 1 for the variable FSi (step S235). If the lexicon does not include the word SWi (NO in step S236), the target-language construct information selection unit 55 substitutes 0 for the variable FSi (step S237). After substituting some value for variable FSi, the target-language construct information selection unit 55 increases the variable i by 1 (step S238). If the value i is less than or equal to h (YES in step S239), the process repeats from step S234. If the value i exceeds h (NO in step S239), the average of FS1 to FSh is acquired, and is set as the evaluation value Sep2 based on the second evaluation criterion for the bilingual example pattern (step S240). The processing of steps S231 to S240 is performed for all the selected bilingual example patterns.

Figures 13, 14:
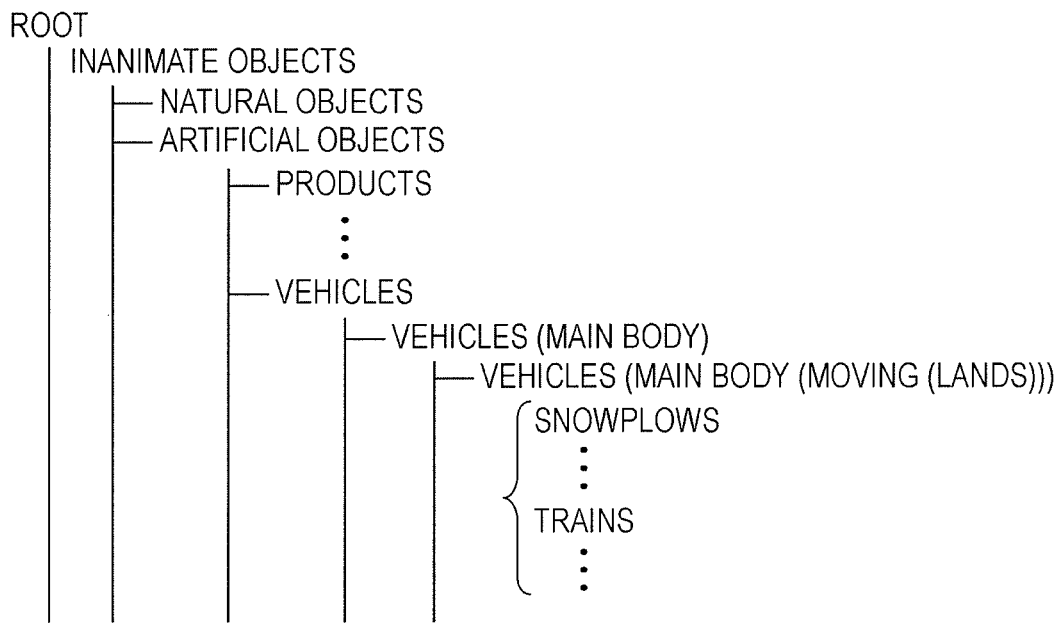
FIG. 13 illustrates an exemplary lexicon.
FIG. 14 illustrates an exemplary bilingual example.

FIG. 13 illustrates an example of a lexicon. For example, in the example illustrated in FIG. 10, when "彼は電車に乗る (he rides a train)" is acquired as input text, "彼 (he)" that is the word corresponding to the first variable item in the source-language construct information is included in the lexicon "persons". As illustrated in FIG. 13, "電車 (a train)" that is the word corresponding to the second variable item is included in the lexicon "vehicles". Therefore, the evaluation value Sep2 is 1 for the bilingual example patterns 1 and 3 in which information about the above lexicons has been set, and the evaluation value Sep2 is 0.5 for the bilingual example pattern in which only the lexicon "persons", which corresponds to the former lexicon information, is set.

The calculation of the evaluation value Sep3 based on the third evaluation criterion (step S173) will be described. The target-language construct information selection unit 55 selects one piece of target-language construct information on the basis of information that associates a character string in the input text corresponding to a variable item in the source-language construct information, the usage example information, and the target-language construct information. First, the target-language construct information selection unit 55 stores information about variable items (the number which is represented by h) in a source-language example pattern included in a certain bilingual example pattern in SP1 to SPh, and initializes variables FS1 to FSh (step S251). Then, the target-language construct information selection unit 55 acquires an influential word from a character string (one or multiple words) in the input text corresponding to each of SP1 to SPh, and stores the influential words in variables SW1 to SWh (step S252). Then, the target-language construct information selection unit 55 substitutes 1 for the variable i (step S253).

The target-language construct information selection unit 55 checks whether or not usage-example information in SPi has been set (step S254). If the usage-example information has not been set (NO in step S254), the target-language construct information selection unit 55 substitutes 1 for the variable FSi (step S255). If the usage-example information has been set (YES in step S254), the target-language construct information selection unit 55 acquires the set of usage examples SPE from the usage-example information in SPi (step S256). Then, the target-language construct information selection unit 55 calculates the degree of similarity SimW between SWi and SPE, and stores the degree of similarity SimW in the variable FSi (step S256). The degree of similarity SimW may be determined by, first, determining a degree of similarity Sim between SWi and a word in an individual usage example included in the set of usage examples. The degree of similarity Sim may be determined using, for example, bigrams of SWi and bigrams in a character string including a word in a usage example by using substantially the same calculation method as that used in the source-language construct information candidate retrieval unit 53. If the number of usage examples included in the set of usage examples is represented by t and the degree of similarity between the j-th usage example and SWi is represented by Sim(j), the degree of similarity SimW may be determined by $$\mathrm{Sim}W = \max\{\mathrm{sim}(1), \mathrm{sim}(2), \ldots, \mathrm{sim}(t)\}.$$

The degree of similarity SimW may also be determined by $$\mathrm{Sim}W = \{\mathrm{sim}(1) + \mathrm{sim}(2) + \ldots + \mathrm{sim}(t)\}/t.$$

After substituting some value for the variable FSi, the target-language construct information selection unit 55 increases the variable i by 1 (step S258). If the value i is less than or equal to h (YES in step S259), the process repeats from step S254. If the value i exceeds h (NO in step S259), the average of FS1 to FSh is acquired, and is set as the evaluation value Sep3 based on the third evaluation criterion for the bilingual example pattern (step S260). The processing of steps S251 to S260 is performed for all the selected bilingual example patterns.

The calculation of the evaluation value Sep4 based on the fourth evaluation criterion (step S174) will be described. The target-language construct information selection unit 55 selects one piece of target-language construct information on the basis of the generation probability of translated text generated using the selected source-language construct information and interlanguage correspondence information. First, the target-language construct information selection unit 55 acquires an influential word from a character string (one or multiple words) in the input text corresponding to each of variable items (the number which is represented by h) in a source-language example pattern included in a certain bilingual example pattern, and stores the influential words in arrays SW1 to SWh (step S271).

Then, the target-language construct information selection unit 55 determines a translated word list for each of SW1 to SWh by using a word dictionary stored in the dictionary unit 57, and stores the translated word lists in TW1 to TWh (step S272). Here, the word dictionary may have one-to-many relationships between the source language and the target language. Therefore, each of TW1 to TWh may include plural translated words. The target-language construct information selection unit 55 determines all possible combinations for selecting a single translated word from each of the translated word lists in TW1 to TWh (step S273). Determining all possible combinations may correspond to determining combinations of translated words to be substituted for a variable item in the target-language construct information. Then, each of the translated words included in each combination is substituted for a corresponding one of the variable items in the target-language example pattern, and is added to a fixed item to generate a translation (step S274). A translated word of a variable item represents only a translated word of an influential word, and the generated translation may be simpler than the intended translated text. Additionally, the generation probability of the translation is generated using an N-gram model of a word for each of the translations generated for the respective combinations (step S275). The largest generation probability is set as the evaluation value Sep4 based on the fourth evaluation criterion for the bilingual example pattern (step S276). The processing of steps S271 to S276 is performed for all the selected bilingual example patterns.

FIG. 16 illustrates translations generated using the bilingual example pattern 1, the bilingual example pattern 2, and the bilingual example pattern 3 when "彼は電車に乗る (he rides a train)" is acquired as input text in the example illustrated in FIG. 10. Information indicating the probability of occurrence of the N-th word from (N−1)-th words in the N-gram model is stored in the dictionary unit 57.

The calculation of the evaluation value Sep5 based on the fifth evaluation criterion (step S175) will be described. Here, a bilingual example dictionary stored in the dictionary unit 57 may also be used as evaluation information, in addition to the correspondence between a source-language example pattern and a target-language example pattern. The bilingual example dictionary includes plural bilingual examples. An individual bilingual example includes an example in the source language that matches any of plural pieces of source-language construct information and an example in the target language that matches any of plural pieces of target-language construct information. FIG. 14 illustrates an exemplary bilingual example. An example in the source language included in the bilingual example and an example in the target language included in the bilingual example may be character strings, and may not necessarily include information about morphological analysis results. The association between the bilingual example and source-language construct information or target-language construct information may be stored in advance.

The target-language construct information selection unit 55 selects one piece of target-language construct information on the basis of the number of bilingual examples including examples in the source language that match the selected source-language construct information and examples in the target language that match the target-language construct information corresponding to the selected source-language construct information. First, the target-language construct information selection unit 55 sequentially acquires one bilingual example pattern among a set of bilingual example patterns including the selected source-language construct information (step S291). Then, the target-language construct information selection unit 55 acquires the set of bilingual examples BSS including examples in the source language that match the selected source-language construct information from the bilingual example dictionary (step S292), and acquires the set of bilingual examples BST including examples in the target language that match target-language construct information of the acquired example pattern from the bilingual example dictionary (step S293). Then, the target-language construct information selection unit 55 determines and stores the number of common bilingual examples included in the sets BSS and BST (step S294). If all the bilingual example patterns have not been acquired (NO in step S295), the process repeats from step S291. If all the bilingual example patterns have been acquired (YES in step S295), the target-language construct information selection unit 55 determines a value normalized so that the maximum number of bilingual examples in each bilingual example pattern may become 1, and stores the value as the evaluation value Sep5 based on the fifth evaluation criterion for each bilingual example pattern (step S296). Specifically, the evaluation value Sep5 may be a value obtained by dividing the number of bilingual examples in each bilingual example pattern by the sum of the numbers of bilingual examples in all the bilingual example patterns.

After the calculation of the evaluation values Sep1 to Sep5 based on the first to fifth evaluation criteria, the target-language construct information selection unit 55 calculates the comprehensive evaluation value SepP of the respective bilingual example patterns (step S176). The comprehensive evaluation value SepP may be a value obtained by adding up the weighted evaluation values Sep1 to Sep5, and may be determined by the following equation if the weights to be assigned to Sep1 to Sep5 are represented by k1 to k5 (i.e., k1, k2, k3, k4, and k5), respectively:

$$SepP = k1 \times FS1 + k2 \times FS2 + k3 \times FS3 + k4 \times FS4 + k5 \times FS5.$$

Then, the target-language construct information selection unit 55 selects one bilingual example pattern with the largest comprehensive evaluation value SepP (step S177). The selected bilingual example pattern includes one piece of target-language construct information, and one piece of target-language construct information has been selected.

FIG. 15 illustrates an example of how to select a target-language example pattern from the candidates illustrated in FIG. 10. In the example illustrated in FIG. 15, the comprehensive evaluation values SepP are calculated using k1=k2=k3=k5=0.15 and k4=0.4. Here, the values k1 to k5 may be any other experimentally determined value.

The translated text output unit 56 may be implemented by the CPU 11, the storage unit 12, the communication unit 13, and the input/output unit 14. The translated text output unit 56 outputs translated text of the input text to an output unit connected to the input/output unit 14, a client device connected via the communication unit 13 and a network, or the storage unit 12 in accordance with the selected target-language construct information and selected source-language construct information corresponding to the target-language construct information. Specifically, a word in input text corresponding to each of variable items included in source-language construct information is translated using a word dictionary to generate a translated word, and the translated word is substituted into the corresponding variable item in a target-language example pattern. The translated words substituted into the variable items in the order indicated by position information and a character string of fixed content are output. Thus, translated text is output. If a certain variable item corresponds to a phrase including plural words, a source-language example pattern and a bilingual example pattern, which match the content of the phrase, are selected, and a translated word is translated.

The translation apparatus 1 according to the illustrated exemplary embodiment may not necessarily be dedicated to the translation of text. For example, the translation apparatus 1 may be incorporated in a translation-aid system.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A bilingual information retrieval apparatus comprising:
an input text acquisition unit that acquires input text in a first language;
a first memory that stores a plurality of pieces of first language construct information indicating a construct of text in the first language, each of the plurality of pieces of first language construct information including a fixed item indicating a fixed character string in the text and a variable item indicating a variable character string in the text;
a first language construct information selection unit that selects a piece of first language construct information corresponding to the input text from among the plurality of pieces of stored first language construct information;

a second memory that stores a plurality of pieces of second language construct information indicating a construct of text in a second language corresponding to the selected piece of first language construct information, each of the plurality of pieces of second language construct information including a fixed item indicating a fixed character string in the text and a variable item indicating a variable character string in the text; and a second language construct information selection unit that selects a piece of second language construct information from among the plurality of pieces of second language construct information stored in the second memory on the basis of evaluation information associated with the plurality of pieces of first language construct information and the plurality of pieces of second language construct information, wherein the evaluation information comprises plural pieces of evaluation information with respect to each of the plurality of pieces of second language construct information, wherein the second language construct information selection unit generates the plural pieces of evaluation information respectively based on plural evaluation criteria, and selects a piece of second language construct information from among the plurality of pieces of second language construct information based on the generated plural pieces of the evaluation information, and wherein the second language construct information selection unit determines a plurality of pieces of representative evaluation information, respectively corresponding to the plurality of pieces of second language construct information, based on a weighted sum of the generated plural pieces of the evaluation information with respect to each of the plurality of pieces of second language construct information, and selects a piece of second language construct information from among the plurality of pieces of second language construct information based on the plurality of pieces of representative evaluation information.

2. The bilingual information retrieval apparatus according to claim 1, wherein the evaluation information includes interlanguage correspondence information indicating a correspondence between each of the plurality of pieces of first language construct information and a piece of second language construct information corresponding to the respective piece of first language construct information, and wherein the second language construct information selection unit selects a piece of second language construct information from among the plurality of pieces of second language construct information on the basis of generation probability of translated text generated using the selected piece of first language construct information and the interlanguage correspondence information.

3. The bilingual information retrieval apparatus according to claim 1, wherein the evaluation information includes information that associates an attribute of the variable items included in the plurality of pieces of first language construct information with the plurality of pieces of second language construct information, and wherein the second language construct information selection unit selects a piece of second language construct information from among the plurality of pieces of second language construct information on the basis of an attribute of a character string in the input text corresponding to the variable item in the selected piece of first language construct information and on the basis of the information that associates an attribute of the variable items included in the plurality of pieces of first language construct information with the plurality of pieces of second language construct information.

4. The bilingual information retrieval apparatus according to claim 3, further comprising a morphological analysis unit that applies morphological analysis to the input text to acquire a plurality of words and part-of-speech information about the words, wherein the evaluation information includes information that associates a part of speech of the variable items included in the plurality of pieces of first language construct information with the plurality of pieces of second language construct information, and wherein the second language construct information selection unit selects a piece of second language construct information from among the plurality of pieces of second language construct information on the basis of information that associates part-of-speech information about a word in the input text with a part of speech of the variable item included in the selected piece of first language construct information.

5. The bilingual information retrieval apparatus according to claim 3, wherein the evaluation information includes information that associates a lexicon of the variable items included in the plurality of pieces of first language construct information with the plurality of pieces of second language construct information, and wherein the second language construct information selection unit selects a piece of second language construct information from among the plurality of pieces of second language construct information on the basis of a character string in the input text corresponding to the variable item in the selected piece of first language construct information and on the basis of the information that associates the lexicon with the plurality of pieces of second language construct information.

6. The bilingual information retrieval apparatus according to claim 3, wherein the evaluation information includes information that associates usage-example information about the variable items included in the plurality of pieces of first language construct information with the plurality of pieces of second language construct information, and wherein the second language construct information selection unit selects a piece of second language construct information from among the plurality of pieces of second language construct information on the basis of a character string in the input text corresponding to the variable item in the selected piece of first language construct information and on the basis of the information that associates the usage-example information with the plurality of pieces of second language construct information.

7. The bilingual information retrieval apparatus according to claim 1, wherein the evaluation information includes a plurality of bilingual examples each including an example in the first language that matches any of the plurality of pieces of first language construct information and an example in the second language that matches any of the plurality of pieces of second language construct information, and wherein the second language construct information selection unit selects a piece of second language construct information from among the plurality of pieces of second language construct information on the basis of the number of bilingual examples including an example in the first language that matches the selected piece of first language construct information and an example in the second language that matches a piece of second language construct information corresponding to the selected piece of first language construct information.

8. A translation apparatus comprising:
an input text acquisition unit that acquires input text that is text input in a first language;
a first language construct information selection unit that selects a piece of first language construct information corresponding to the input text from among a plurality of pieces of first language construct information indicating a construct of text in the first language, each of the plurality of pieces of first language construct information including a fixed item indicating a fixed character string in the text and a variable item indicating a variable character string in the text;
a second language construct information selection unit that selects a piece of second language construct information from among a plurality of pieces of second language construct information indicating a construct of text in a second language corresponding to the selected piece of first language construct information, each of the plurality of pieces of second language construct information including a fixed item indicating a fixed character string in the text and a variable item indicating a variable character string in the text, on the basis of evaluation information associated with any of the plurality of pieces of first language construct information and any of the plurality of pieces of second language construct information; and
a translated text output unit that outputs translated text of the input text on the basis of the selected piece of second language construct information and the selected piece of first language construct information corresponding to the selected piece of second language construct information,
wherein the evaluation information comprises plural pieces of evaluation information with respect to each of the plurality of pieces of second language construct information,
wherein the second language construct information selection unit generates the plural pieces of evaluation information respectively based on plural evaluation criteria, and selects a piece of second language construct information from among the plurality of pieces of second language construct information based on the generated plural pieces of the evaluation information, and
wherein the second language construct information selection unit determines a plurality of pieces of representative evaluation information, respectively corresponding to the plurality of pieces of second language construct information, based on a weighted sum of the generated plural pieces of the evaluation information with respect to each of the plurality of pieces of second language construct information, and selects a piece of second language construct information from among the plurality of pieces of second language construct information based on the plurality of pieces of representative evaluation information.

9. A non-transitory computer readable medium storing a program causing a computer to execute a process, the process comprising:
acquiring input text in a first language;
storing, in a first memory, a plurality of pieces of first language construct information indicating a construct of text in the first language, each of the plurality of pieces of first language construct information including a fixed item indicating a fixed character string in the text and a variable item indicating a variable character string in the text;
selecting a piece of first language construct information corresponding to the input text from among the plurality of pieces of stored first language construct information;
storing, in a second memory, a plurality of pieces of second language construct information indicating a construct of text in a second language corresponding to the selected piece of first language construct information, each of the plurality of pieces of second language construct information including a fixed item indicating a fixed character string in the text and a variable item indicating a variable character string in the text; and
selecting a piece of second language construct information from among the plurality of pieces of second language construct information stored in the second memory on the basis of evaluation information associated with the plurality of pieces of first language construct information and the plurality of pieces of second language construct information,
wherein the evaluation information comprises plural pieces of evaluation information with respect to each of the plurality of pieces of second language construct information, and
the selecting comprises:
generating the plural pieces of evaluation information respectively based on plural evaluation criteria, and
selecting a piece of second language construct information from among the plurality of pieces of second language construct information based on the generated plural pieces of the evaluation information,
wherein the selecting further comprises:
determining a plurality of pieces of representative evaluation information, respectively corresponding to the plurality of pieces of second language construct information, based on a weighted sum of the generated plural pieces of the evaluation information with respect to each of the plurality of pieces of second language construct information, and
selecting a piece of second language construct information from among the plurality of pieces of second language construct information based on the plurality of pieces of representative evaluation information.

* * * * *